(12) United States Patent
Sivabalan et al.

(10) Patent No.: US 11,552,879 B1
(45) Date of Patent: Jan. 10, 2023

(54) CREATING A PACKET WITH A LOOPBACK LABEL STACK TO DETECT NETWORK LINK/NODE FAILURES

(71) Applicant: Ciena Corporation, Hanover, MD (US)

(72) Inventors: Muthurajah Sivabalan, Kanata (CA); Sami Boutros, Union City, CA (US); Frédéric Perras, Cantley (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/550,018

(22) Filed: Dec. 14, 2021

(51) Int. Cl.
| | | |
|---|---|---|
| G06F 15/173 | (2006.01) | |
| H04L 45/24 | (2022.01) | |
| H04L 45/42 | (2022.01) | |
| H04L 43/0823 | (2022.01) | |
| H04L 45/02 | (2022.01) | |
| H04L 45/12 | (2022.01) | |

(52) U.S. Cl.
CPC .......... *H04L 45/24* (2013.01); *H04L 43/0847* (2013.01); *H04L 45/02* (2013.01); *H04L 45/123* (2013.01); *H04L 45/42* (2013.01)

(58) Field of Classification Search
CPC ..... H04L 45/24; H04L 43/0847; H04L 45/02; H04L 45/123; H04L 45/42
USPC ........................................................ 709/238
See application file for complete search history.

(56) References Cited

U.S. PATENT DOCUMENTS

| | | |
|---|---|---|
| 7,016,947 B1 * | 3/2006 | Ah Sue ............... H04L 61/5092 709/239 |
| 7,120,792 B1 | 10/2006 | Jacobson et al. |
| 7,197,573 B1 | 3/2007 | Jacobson et al. |
| 7,430,176 B2 | 9/2008 | Nalawade et al. |
| 7,539,191 B1 | 5/2009 | Jacobson |
| 7,684,351 B2 | 3/2010 | Vasseur et al. |
| 8,135,834 B1 | 3/2012 | Jacobson et al. |
| 8,274,901 B1 | 9/2012 | Casner et al. |
| 8,422,502 B1 | 4/2013 | Alaettinoglu et al. |
| 8,824,331 B1 | 9/2014 | Alaettinoglu et al. |
| 8,937,946 B1 | 1/2015 | Kanna et al. |
| 9,979,629 B2 | 5/2018 | Sivabalan et al. |
| 10,033,623 B2 | 7/2018 | Jain et al. |
| 10,158,558 B1 | 12/2018 | Ward et al. |
| 10,165,093 B2 | 12/2018 | Filsfils et al. |
| 10,171,338 B2 | 1/2019 | Filsfils et al. |
| 10,250,494 B2 | 4/2019 | Sivabalan et al. |

(Continued)

FOREIGN PATENT DOCUMENTS

| | | |
|---|---|---|
| EP | 3 038 301 B1 | 3/2020 |
| WO | 2021/0967231 A1 | 4/2021 |

*Primary Examiner* — Anthony Mejia
(74) *Attorney, Agent, or Firm* — Clements Bernard Baratta; Lawrence A. Baratta, Jr.; Christopher L. Bernard

(57) ABSTRACT

Systems and methods for creating loopback packets for transmission through a section of a network for the purpose of testing the operability of links and nodes in this section of the network are provided. A method, according to one implementation, includes a step of obtaining information, by a Network Element (NE), about the topology of the network related to at least the nodes in direct communication with a peer node. The method also includes a step of generating one or more loopback packets, where each loopback packet includes at least a header having a path list including one or more nodes of the plurality of nodes in the network. Each path list defines an order of nodes through which the respective loopback packet is to be transmitted.

20 Claims, 4 Drawing Sheets

(56) References Cited

U.S. PATENT DOCUMENTS

| | | | |
|---|---|---|---|
| 10,277,558 B2 | 4/2019 | Khan et al. | |
| 10,291,516 B2 | 5/2019 | Bryant et al. | |
| 10,454,821 B2 | 10/2019 | Filsfils et al. | |
| 10,567,295 B2 | 2/2020 | Barton et al. | |
| 10,740,408 B2 | 8/2020 | Ramasamy et al. | |
| 10,833,976 B2 | 11/2020 | Saad et al. | |
| 10,868,755 B2 | 12/2020 | Filsfils et al. | |
| 11,057,278 B1 | 7/2021 | Côté et al. | |
| 2014/0269422 A1* | 9/2014 | Filsfils | H04L 45/12 370/254 |
| 2015/0271034 A1 | 9/2015 | Kanna et al. | |
| 2016/0057049 A1 | 2/2016 | Jacobson et al. | |
| 2016/0191324 A1 | 6/2016 | Olofsson et al. | |
| 2019/0149449 A1* | 5/2019 | Morris | H04L 45/22 709/245 |
| 2019/0297017 A1 | 9/2019 | Pignataro et al. | |
| 2019/0379601 A1 | 12/2019 | Khan et al. | |
| 2020/0112495 A1 | 4/2020 | Attarwala et al. | |
| 2020/0153856 A1 | 5/2020 | Nainar et al. | |
| 2020/0220811 A1 | 7/2020 | Shah | |
| 2021/0092043 A1 | 3/2021 | Filsfils et al. | |
| 2021/0160174 A1 | 5/2021 | Kashyap et al. | |
| 2021/0243095 A1 | 8/2021 | Attarwala et al. | |

* cited by examiner

CREATING A PACKET WITH A LOOPBACK LABEL STACK TO DETECT NETWORK LINK/NODE FAILURES

TECHNICAL FIELD

The present disclosure generally relates to networking systems and methods. More particularly, the present disclosure relates to systems and methods for creating a loopback packet having a path list or label stack that defines a path that loops back to an originating node and transmitting the loopback packet through a network according to the path list to distinguish link failures from node failures.

BACKGROUND

Generally, Bidirectional Forwarding Detection (BFD) is a protocol that is used for detecting faults in a communications network. BFD is normally implemented to discover faults between a pair of nodes (e.g., routers, switches, etc.) connected by a link (e.g., optical fiber link). If a first node detects a fault with respect to communications with a second node, the first node usually assumes that the fault is within the second node itself. Protection paths can thereby be arranged to avoid this second node. However, BFD does not allow the first node to determine if the fault is a "node failure" (i.e., a failure at the second node) or if it is a "link failure" in the link connecting the first and second nodes.

In the case of multi-hop BFD or Seamless BFD (S-BFD), there is a need to detect the operability or liveness of a node in a reliable manner. BFD packets should follow the same set of nodes/links in both directions. Even if the forward Segment Identifier (SID) stack may be a Topology Independent—Loop-Free Alternate (TI-LFA) backup path computed by a Point of Local Repair (PLR) device, operators need to derive the reverse SID stack from the forward path for BFD or S-BFD to use. Besides, a TI-LFA backup path can change due to topological change. Reverse SID stack must be derived again whenever TI-LFA backup paths change. This adds to operational complexity.

Also, BFD requires more processing of configurations (e.g., double-sided) on the PLR as well as all of its neighbors. Therefore, there is a need in the field of fault detection in a communications network to simplify the configuring processes of the multiple nodes whereby the PLR, by itself, can configure a testing strategy that enable the PLR to determine if a fault is a node fault or a link fault, regardless of the number of protected links and nodes in a system.

BRIEF SUMMARY

The present disclosure is directed to systems and methods for creating "loopback" packets having a SID list or label stack that defines a specific path through a network whereby an initiating node is configured as the last node in the list and therefore starts and ends the transmission of the packet. Therefore, the test packet (e.g., loopback packet) may be sent in a scouting-type mission to detect operability of links and nodes and return back without any of the forwarding nodes in the path being aware that they were part of the test, but simply passed the packet along to the next node without processing the payload of the loopback packets.

A Network Element (NE), according to one implementation, may be configured to operate as a node in a network having a plurality of nodes. The NE may include a processing device and a memory device, where the memory device may be configured to store a computer program having instructions that, when executed, enable the processing device to obtain information about the topology of the network related to at least the nodes in direct communication with a peer node. Also, the instructions may further enable the processing device to generate one or more loopback packets. Each loopback packet may include at least a header having a path list including one or more nodes of the plurality of nodes in the network. Each path list may be configured to define an order of nodes and/or links through which the loopback packets are transmitted. In some cases, the network may allow the implementation of Segment Routing (SR), whereby the path list may be a Segment Identifier (SID) list.

Furthermore, the NE may be a Point of Local Repair (PLR) node, whereby the processing device may be configured to generate the one or more loopback packets in response to detecting the existence of a failure in transmitting a packet to the peer node. The processing device may also be configured to utilize Bidirectional Forwarding Detection (BFD) to detect the existence of the failure in transmitting the packet to the peer node. A "My Discriminator" field and a "Your Discriminator" field in BFD may be set to the same value associated with the NE. The instructions may further enable the processing device to transmit the one or more loopback packets through the network and then determine which, if any, loopback packets are returned to the NE. Based on which of the one or more loopback packets are returned, the processing device may be configured to analyze whether the failure is a node failure of the peer node itself or a link failure of one or more links associated with the peer node. If no loopback packets are returned to the NE, the processing device may be configured to determine that the failure is a node failure.

In some embodiments, each path list may be configured to read the same forwards as it does backwards (e.g., in a palindromic fashion). Each loopback packet may include data that identifies an attempted path associated with the path list of the respective loopback packet. Also, according to some embodiments, only the NE may be configured to process the data of each of the one or more loopback packets. The instructions may further enable the processing device to generate a number of loopback packets related to the number of links in direct communication with the peer node. The step of obtaining information regarding at least the topology of the network in direct communication with the peer node may include, in some cases, the step of utilizing the Interior Gateway Protocol (IGP), whereby generating the one or more loopback packets may be based on the topology information.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
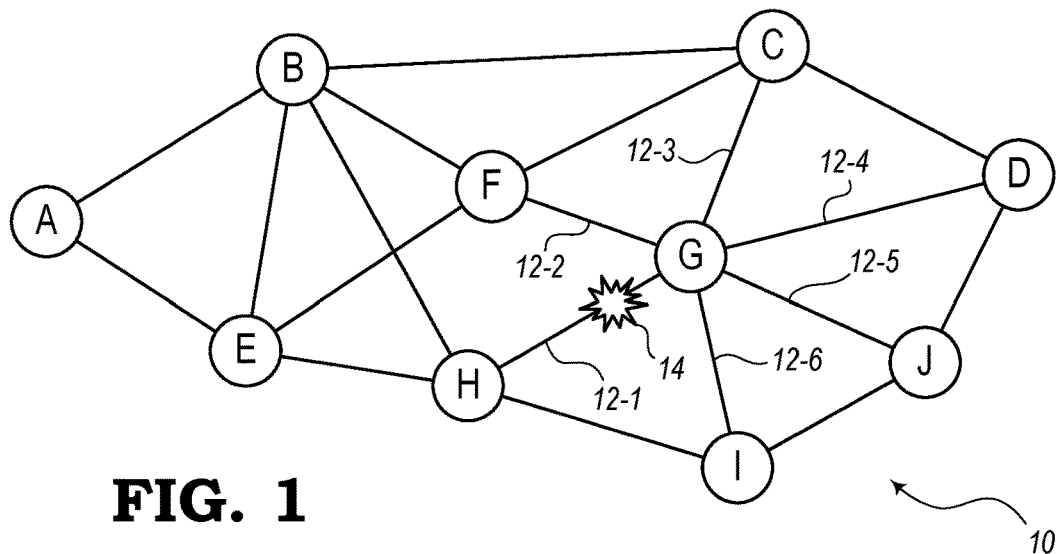
FIG. 1 is a diagram illustrating a section of a communications network, according to various embodiments.

The present disclosure relates to systems and methods for utilizing various failure detection protocols (e.g., Bidirectional Forwarding Detection (BFD), Seamless BFD (S-BFD), etc. or simply crafting custom control packets) and/or modifying these various protocols to allow a node (e.g., a Point of Local Repair (PLR) node) to determine if a failure detected in a communications network might be classified as a node failure or a link failure. For instance, if it is determined that a failure is actually a fault on a link between two nodes, then there is no reason to bypass the node on the other side of this link, especially if that node is operational (except for the communication along the faulty link). By obtaining a more actual picture of where one or more faults are located, any backup (protection) paths can be planned to avoid only the faulty elements of the network without assuming that an entire node needs to be avoided.

The present disclosure describes embodiments that can be enabled via a new global configuration or can be automatically enabled when Topology Independent-Loop-Free Alternate (TI-LFA) is configured on a PLR device. The solutions described with respect to the present disclosure can provide benefits to Network Elements (NEs) or nodes used throughout a network to accurately differentiate between a node failure and a link failure and provide better local protection to minimize traffic loss.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in many ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Segment Routing (SR)

Segment Routing (SR) is a technology that implements a source routing paradigm. A packet header includes a stack of function identifiers, known as segments, which define an ordered list of functions to be applied to the packet. A segment can represent any instruction (e.g., topological or service-based). A segment can have a local semantic to an SR node or global within an SR domain. These functions include, but are not limited to, the forwarding behaviors to apply successively to the packet, notably destination-based unicast forwarding via a sequence of explicitly enumerated nodes (domain-unique node segments) and links (adjacency segments), and the like. SR allows forcing a flow through any topological path and service chain while maintaining a per-flow state only at the ingress node to the SR domain. SR is described, e.g., in Fiflsfils et al., RFC 8402, "Segment Routing Architecture," Internet Engineering Task Force (IETF), July 2018, the contents of which are incorporated herein by reference. A particular attraction of SR is that it obviates the need to install and maintain any end-to-end (e2e) path state in the core network. Only the ingress node for a particular flow needs to hold the segment stack, which is applied as the header of every packet of that flow, to define its route through the network. This makes SR particularly suited to control by a Software-Defined Networking (SDN) model.

SR can be directly applied to MPLS with no change in the forwarding plane. A segment is encoded as an MPLS label. An ordered list of segments is encoded as a stack of labels. The segment to process is on the top of the stack. Upon completion of a segment, the related label is popped from the stack. SR can also be applied to the Internet Protocol (IP) (e.g., v6) architecture with a new type of routing extension header, such as, for example, according to the document published in July 2015 as draft-previdi-6man-segment-routing-header (available online at "tools.ietforg/html/draft-previdi-6 man-segment-routing-header-08" and this draft is now RFC 8754, "IPv6 Segment Routing Header (SRH)," March 2020). A segment is encoded as an IPv6 address. An ordered list of segments is encoded as an ordered list of IPv6 addresses in the routing extension header. The segment to process at any point along the path through the network is indicated by a pointer in the routing extension header. Upon completion of a segment, the pointer is incremented. SR can also be applied to Ethernet (e.g., IEEE 802.1 and variants thereof). There are numerous benefits asserted for SR, including, for example, scalable end-to-end policy, easy incorporation in IP and SDN architectures, operational simplicity, a balance between distributed intelligence, centralized optimization, and application-based policy creation, and the like.

In loose source routing such as SR, a source node chooses a path and encodes the chosen path in a packet header as an ordered list of segments. The rest of the network executes the encoded instructions without any further per-flow state. SR provides full control over the path without the dependency on network state or signaling to set up a path. This makes SR scalable and straight-forward to deploy. SR natively supports both IPv6 (SRv6) and MPLS (SR-MPLS) forwarding planes and can co-exist with other transport technologies (e.g., Resource Reservation Protocol (RSVP)-Traffic Engineering (RSVP-TE), Label Distribution Protocol (LDP), and the like).

In SR, a path includes segments which are instructions a node executes on an incoming packet. For example, segments can include forward the packet according to the shortest path to the destination, forward through a specific interface, or deliver the packet to a given application/service instance). Each segment is represented by a Segment Identifier (SID). All SIDs are allocated from a Segment Routing Global Block (SRGB) with domain-wide scope and significance, or from a Segment Routing Local Block (SRLB) with local scope. The SRGB includes the set of global segments in the SR domain. If a node participates in multiple SR domains, there is one SRGB for each SR domain. In SRv6, the SRGB is the set of global SRv6 SIDs in the SR domain.

A segment routed path is encoded into the packet by building a SID stack that is added to the packet. These SIDs are popped by processing nodes, and the next SID is used to decide forwarding decisions. A SID can be one of the following types: an adjacency SID, a prefix SID, a node SID, a Binding SID (BSID), and an any-cast SID. Each SID represents an associated segment, e.g., an adjacency segment, a prefix segment, a node segment, a binding segment, and an any-cast segment.

An adjacency segment is a single-hop (i.e., a specific link). A prefix segment is a multi-hop tunnel that can use equal-cost multi-hop aware shortest path links to reach a prefix. A prefix SID can be associated with an IP prefix. The prefix SID can be manually configured from the SRGB and can be distributed by Intermediate System to Intermediate System (IS-IS), Open Shortest-Path First (OSPF), etc. The prefix segment steers the traffic along the shortest path to its destination. A node SID is a special type of prefix SID that identifies a specific node. It is configured under the loopback interface with the loopback address of the node as the prefix. A prefix segment is a global segment, so a prefix SID is globally unique within the segment routing domain. An adjacency segment is identified by a label called an adjacency SID, which represents a specific adjacency, such as egress interface, to a neighboring router. The adjacency SID is distributed by IS-IS or OSPF. The adjacency segment steers the traffic to a specific adjacency.

A binding segment represents an SR policy. A head-end node of the SR policy binds a Binding SID (BSID) to its policy. When the head-end node receives a packet with an active segment matching the BSID of a local SR Policy, the head-end node steers the packet into the associated SR Policy. The BSID provides greater scalability, network opacity, and service independence. Instantiation of the SR Policy may involve a list of SIDs. Any packets received with an active segment equal to BSID are steered onto the bound SR Policy. The use of a BSID allows the instantiation of the policy (the SID list) to be stored only on the node or nodes that need to impose the policy. The direction of traffic to a node supporting the policy then only requires the imposition of the BSID. If the policy changes, this also means that only the nodes imposing the policy need to be updated. Users of the policy are not impacted. The BSID can be allocated from the local or global domain. It is of special significance at the head-end node where the policy is programmed in forwarding.

SR Traffic Engineering (SR-TE) provides a mechanism that allows a flow to be restricted to a specific topological path, while maintaining per-flow state only at the ingress node(s) to the SR-TE path. It uses the Constrained Shortest Path First (CSPF) algorithm to compute paths subject to one or more constraint(s) (e.g., link affinity) and an optimization criterion (e.g., link latency). An SR-TE path can be computed by a head-end of the path whenever possible (e.g., when paths are confined to single IGP area/level) or at a Path Computation Element (PCE) (e.g., when paths span across multiple IGP areas/levels). Since SR is unidirectional, transmission from a first node to a second node may take one path while transmission in the reverse direction may take another path.

The SR path (or SR policy) includes a set segment lists that may be explicitly or statically configured. If an SR path becomes active, then traffic matching the SR policy is load-balanced across the segment lists of the path in an equal, unequal, or weighted distribution. Each path is associated with a BSID, which is a SID value that represents a SR policy (or more specifically, its selected path) to upstream routers. BSIDs provide isolation or decoupling between different source-routed domains and improve overall network scalability. Usually, all candidate paths of a SR policy are assigned the same BSID. The BSID may be associated with a static policy in the form of an MPLS label (e.g., in the range from 32 to 1048575). The BSID is a label that is available in the reserved-label-block associated with SR policies and enables an SR policy to be activated.

In some cases, an SR policy (i.e., SR path) may be identified by a tuple (e.g., head-end router, color, and end point). A SR policy may be selected from one or more candidate paths and installed in a data plane. Certain properties of the SR policy may come from the selected path (e.g., BSID, segment list, etc.). The "head-end" is the network element (e.g., node, router, switch, etc.) where the SR Policy is initiated. The "color" is a numerical value that is used to differentiate an SR policy from the multiple SR policy candidates between a particular pair of network elements. The color determines the set of traffic flows steered by the SR policy. The "end-point" is the remote network element that represents the destination of the SR policy.

Bidirectional Forwarding Detection (BFD)

Bidirectional Forwarding Detection (BFD) is a network protocol that is used to detect faults between two routers or switches connected by a link. BFD provides low-overhead detection of faults even on physical media that do not support other types of failure detection. BFD includes establishing a session between two endpoints over a particular link. If more than one link exists between them, multiple BFD sessions may be established.

BFD normally does not have a discovery mechanism associated with it. However, according to the various embodiments of the present disclosure, an SR discovery process may proceed BFD, as described herein. BFD may be used on different underlying transport mechanisms and layers or may operate independently of them. Therefore, BFD may be encapsulated within whatever transport mechanism it uses. For example, the process of monitoring MPLS Label Switched Paths (LSPs) may involve establishing a piggybacking session on LSP ping packets. Protocols that support some form of adjacency setup (e.g., OSPF, IS-IS, BGP, RIP, etc.) may also be used to bootstrap a BFD session. These protocols may then use BFD to receive faster notification of failing links than would normally be possible using the protocol's own keep-alive mechanism.

Seamless BFD (S-BFD)

Seamless Bidirectional Forwarding Detection (S-BFD) is a simplified mechanism for using BFD with a substantial proportion of negotiation aspects eliminated. S-BFD provides benefits such as quick provisioning, improved control, and flexibility for network nodes initiating path monitoring. S-BFD provides improvements to BFD that can be used to better fit existing technologies, to further improve efficiency, and expand failure detection coverage, which can enable BFD on a wider scale.

S-BFD may use core BFD technologies to leverage existing implementations and protocol machinery, while providing a simplified and largely stateless infrastructure for continuity testing. One key aspect of the S-BFD mechanism is that it eliminates the time between a network node wanting to perform a continuity test and the network node actually completing the continuity test. In traditional BFD, the initial state would need to change from DOWN to UP, whereby in S-BFD, this state change is virtually nonexistent. Thus, removal of this "seam" (i.e., time delay) in BFD to create this Seamless BFD (S-BFD) provides a smooth and continuous operational experience for applications.

An S-BFD module on each network node allocates one or more S-BFD discriminators for local entities and creates a reflector BFD session. Allocated S-BFD discriminators may be advertised by applications (e.g., OSPF, IS-IS, etc.). The required result is that applications on other network nodes will know about the S-BFD discriminators allocated by a remote node.

The reflector BFD session, upon receiving an S-BFD control packet targeted to one of the local S-BFD discriminator values, is configured to transmit a response S-BFD control packet back to the initiator. Once this setup is complete, any network node that knows about the S-BFD discriminator allocated by a remote node to a remote entity or entities can quickly perform a continuity test to the remote entity by simply sending S-BFD control packets with a corresponding S-BFD discriminator value in the "Your Discriminator" field.

An S-BFD module (e.g., first node) in a system (e.g., with IS-IS identifier "xxx") allocates an S-BFD discriminator (e.g., "123"), and IS-IS advertises the S-BFD discriminator 123 in an IS-IS variable with a Type-Length-Value (TLV) format. Another S-BFD module (e.g., second node) in the system (e.g., with IS-IS identifier "yyy") allocates an S-BFD Discriminator 456 and IS-IS advertises the S-BFD Discriminator 456 in an IS-IS TLV. A reflector BFD session is created on both network nodes.

When the first node wants to check the reachability of the second node, the first node can send an S-BFD control packet destined to the second node with the Your Discriminator field set to 456. When the reflector BFD session on the second node receives this S-BFD control packet, then a response S-BFD control packet is sent back to the first node, which allows the first node to complete the continuity test.
Network FIG. 1 is a diagram illustrating an embodiment of a section of a network 10 (e.g., communications network). As shown in this embodiment, the network 10 includes Nodes A-J arranged with various connectivity via links 12. In this example, suppose Node H is used to test communication capabilities with respect to Node G, but a fault 14 is detected. However, at this point, it is not known whether the fault 14 is with Node G itself (i.e., node fault) or if it is a fault on the link 12-1 (or "H-G link") connecting Nodes H and G. In this respect, Node H is configured to act as a Point of Local Repair (PLR) device.

According to other embodiments, however, testing of Node G and its corresponding links 12-1, 12-2, 12-3, 12-4, 12-5, 12-6 does not necessarily need to follow the detection of a fault or failure. Instead, the testing may be part of scouting process for determining the status of Node G and its links. Therefore, even though many embodiments described in present disclosure are described in response to a fault detection, it should be noted that the action of creating a unique label stack for a loopback (or boomerang) response is a procedure that is regarded as different from conventional systems and does not necessarily require fault detection.

Nevertheless, for the sake of simplicity, fault detection is described with respect to many embodiments herein. Again, failure may be detected by BFD or by other means. A failure may be detected, but the PLR (e.g., Node H) does not know if it a node failure or a link failure. The PLR crafts one or more packets to determine if it is a link failure or a node failure. These packets may have a header which includes a loopback structure for defining a surveillance path from the PLR through one or more node to an "end" node (e.g., Node G) and then back to the PLR. The return path can be same as the forward path or, in other embodiments, can be different.

By analyzing the results of the packets that return successfully, the PLR can determine which node or nodes and/or which link or links are problematic. For example, it may normally be assumed that Node G is problematic because Node H (i.e., the PLR in this case) determines that communication with Node G is down. However, if the loopback packets (e.g., which may also be referred to as test packets, scouting packets, surveillance packets, reconnaissance packets, etc.) are able to reach Node G and return successfully back to Node H, then it can be determined that Node G is not the problem, but one or more links are faulty instead.

Therefore, the loopback packets can be crafted by the PLR to come at the node being tested (e.g., Node G) from multiple directions. In the example of FIG. 1, Node H (i.e., equipped with the functionality described in the present disclosure) can generate multiple loopback packets to approach Node G via links 12-2 (i.e., the F-G link), 12-3 (i.e., the C-G link), 12-4 (i.e., the D-G link), 12-5 (i.e., the J-G link), and 12-6 (i.e., the I-G link).

Based on the knowledge that Node H may obtain regarding the topology of the network 10, Node H can generate multiple loopback packets having headers that define a path list (i.e., an order of nodes and/or links through which the packets will traverse). For example, this path list may be a SID list or other suitable list for defining the order of nodes or Network Elements (NEs) and/or links that the packet will go to. When one node receives the packet, it may normally be designed to pop the top address from the list (related to the next node) and transmit the packet to this next node. These popping and transmitting steps may be done with the information in the header without actually processing any payload.
Label Stack Examples For example, in the example of FIG. 1, Node H (with knowledge of the topology of the network 10) may create five loopback packets having the following label stacks (e.g., path lists, SID lists, etc.) in the header of the packets:
Label Stack of Packet #1 (for testing the link 12-2): This may include a node SID, adjacency SID, as well as Binding SID)
   Node H
   Node E
   Node F
   Node G
   Node F
   Node E
   Node H
Label Stack of Packet #2 (for testing the link 12-3):
   Node H
   Node B
   Node C
   Node G Node C
Node B
Node H
Label Stack of Packet #3 (for testing the link 12-4):
Node H
Node I
Node J
Node D
Node G
Node D
Node J
Node I
Node H
Label Stack of Packet #4 (for testing the link 12-5):
Node H
Node I
Node J
Node G
Node J
Node I
Node H
Label Stack of Packet #5 (for testing the link 12-6):
Node H
Node I
Node G
Node I
Node H It may be noted that these packets are designed to define various paths from Node H to Node G and the reversed return path from Node G back to Node H. Thus, this back and forth path-defining strategy may be considered to have a "boomerang" effect, where the test packet is sent out and is designed to return back to its sender.

Also, packets #1-5 utilize each of the other links 12-2, 12-3, 12-4, 12-5, and 12-6, respectively. When, or if, the packets are successfully returned to Node H (i.e., the PLR), Node H can then determine where the faults are located. If no packets are returned, it can be assumed that Node G itself is faulty. However, if one or more packets are returned, it can be assumed that Node G is not faulty, but one or more links (e.g., 12-1, 12-2, 12-3, 12-4, 12-5, 12-6) associated with Node G are faulty.

Another observation that can be made with respect to the path list included in the header of each loopback packet is that the list (or label stack) can be read backwards the same as it reads forwards. In this respect, it may be considered to have a "palindromic" order.

However, according to other embodiments, other paths may be used that include a more circuitous route (e.g., not palindromic), where the forward path is different from the return path. For example, one path that touches each of links 12-2, 12-3, 12-4, 12-5, 12-6 may have a path list with labels ordered H-B-F-G-C-D-G-J-I-G-I-H. Thus, all of the links can be tested at one time with only one packet. In this example, this test packet will only inform the PLR whether or not any faults are present and may be used as an initial test to see if more precise fault location is needed in later tests.

Also, it should be noted that this strategy differs from the originator node and reflector node strategies used with BFD and S-BFD. For example, according to conventional BFD and S-BFD, the reflector node would be required to include the same control plane presence for understanding how to provide a return packet back to the originator node. However, according to the embodiments of the present disclosure, only the PLR (e.g., originator) may be equipped with the functionality described herein to take full control over the route of the test packet. Since the PLR is both the source (originator) and destination (reflector) in this scenario, only the PLR needs to know what is going on with the packet and only the PLR will process the SID list. The other nodes may not be aware that they are simply be used for testing purposes and will forward the loopback packets in a reflection-type manner without knowledge. They will simply pop the top label and send the packet to the next node.

Thus, the PLR can create a path list (e.g., labels) that causes each node to pass the packet on to the next node and/or link in the list without processing the payload. As engineered according to the techniques described in the present disclosure, this list includes transport through the network in a way that uses knowledge of the topology of the network (e.g., which may already be understood) and approaches the node to be tested from multiple different directions. Using the technique, the PLR can craft the path list (e.g., SID list) to have the packet go out through the network and return back to itself. No configurations are needed on the other nodes since they are just doing what they are designed to do (i.e., forward the packet to the next node).

Payload

The payload (or Protocol Data Unit (PDU)) of the loopback packets described in the present disclosure may include any suitable data. However, in some embodiments, the payload may not include any data at all. For example, with no data, the PLR may plan to send one loopback packet at one time and wait for this packet to return to itself (e.g., within a reasonable amount of time). If no such packet is returned, it can be assumed that this particular path includes a fault. Then, the PLR may send out another packet and wait for a return, and so on. The PLR may be configured in this respect to keep track of which paths were tested with regard to the specific packets and then analyze the results later (e.g., after all packets have been looped through the network).

In some embodiments, which may be preferred in the present disclosure, the PLR may include specific information in the payload that can be used to identify the path associated with that packet. In this respect, all these loopback packets may essentially be sent out simultaneously and received at about the same time as well. Then, by observing the payload (i.e., with information about the paths), the PLR can determine which paths (if any) were successful and which paths (if any) were unsuccessful. Since the payload will not be touched by other nodes, the PLR can be assured that the test information (e.g., paths attempted) can be returned if those paths are non-faulty.

Loopback Packets in BFD

With respect to BFD, the PLR may send a loopback packets in the form of a BFD packet. In this respect, the BFD packet will include a My Discriminator value (address) and a Your Discriminator value (address), where the PLR may set both of these values to be the same. That is, both the My Discriminator and Your Discriminator values are set to the address of the PLR (e.g., Node H) to define itself as both the originator and the reflector. Of course, once the PLR receives the packet as the reflector, it does not need to reflect a response again since the one packet, by itself, defines both the forward and reverse routes.

It should also be noted that detecting the node failures and link failures may simply be a use case of the loopback packet techniques described in the present disclosure. The loopback packet transmission, routing, and analysis may also be used for other purposes as well, such as for testing the operability of the network 10, testing latency of various paths in the network 10, or other purposes. In many cases, though, the loopback packet techniques may be used after a failure is detected in the communication between two peer nodes.

According to conventional systems, if a failure is detected, it is normally assumed that it is a node failure. Then, these systems may compute a backup or protection path to avoid this node. However, the embodiments of the present disclosure are configured to determine with more certainty whether a failure is indicative of a node failure or one or more link failures.

Also, using BFD according to conventional strategies would require a more time-consuming, manual process. An operator would need to create BFD sessions, then create SID lists based on the configurations. Also, each node would need to be BFD aware (or BFD capable). However, with respect to the embodiments of the present disclosure, only the one tester node (e.g., a PLR) needs to be aware of the loopback routing, while the other nodes will just respond appropriately by forwarding the packets according to the tester node's plan, simply playing their role in the SR network.

The PLR can be any intermediate node in the network 10 that is configured to reroute around a failure in a minimal sense. For example, according to Multi-Protocol Label Switching (MPLS) local protection (e.g., MPLS fast reroute, MPLS local restoration, etc.), the PLR may operate in a way to locally restore data traffic. The PLR may use resource reservation protocol (RSVP) traffic engineering (RSVP-TE). With MPLS local protection, each Label Switched Path (LSP) passing through a node may be protected by a backup or alternate path. The PLR device is node where the backup path originates and is the node immediately upstream of the peer node with which communication is cut off.

The PLR node can then redirect the traffic onto the preset backup path. The node where the backup path or LSP merges back with the primary LSP may be referred to as a Merge Point (MP) node. The MPLS local protection technique provides faster recovery than other strategies because the recovery procedure is handled locally. On the other hand, when recovery mechanisms are employed at the IP layer, restoration may take several seconds, which, in many applications, is unacceptable. Thus, MPLS local protection is able to meet the requirements of real-time applications with recovery times of less than about 50 ms, which is comparable to the recovery times of shortest path bridging networks, SONET rings, etc.

Point of Local Repair (PLR) Node

Figure 2:
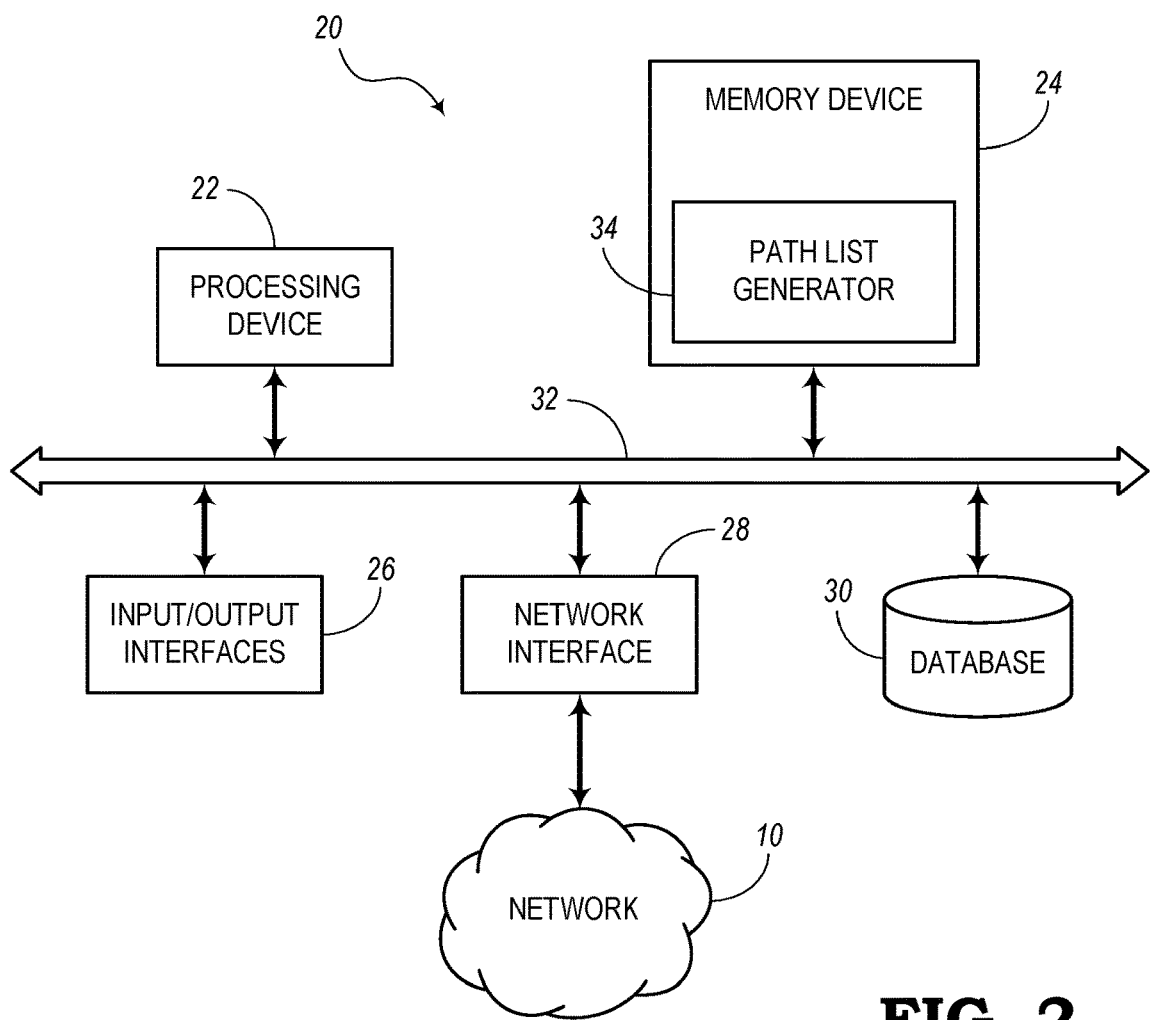
FIG. 2 is a block diagram illustrating a Network Element (NE) operating in the communications network of FIG. 1, according to various embodiments.

FIG. 2 is a block diagram illustrating an embodiment of a Network Element (NE) 20 operating in the network 10 of FIG. 1. The NE 20 may include any of the nodes (e.g., Nodes A-J), routers, switches, or suitable components operating in the network 10. When operating in response to the detection of a failure in the transmission of packets from one node to a peer node, the NE 20 may be implemented as a PLR node for bypassing the link to the peer node. Again, the NE 20 may utilize MPLS local protection techniques for bypassing the link in this regard. However, it should also be noted that the NE 20 described herein does not necessarily need to be configured as a PLR device, but may simply be any node that wishes to determine the status of another node (e.g., a peer node) and its corresponding links to other nodes.

The NE 20 may be a digital computing device that generally includes a processing device 22, a memory device 24, Input/Output (I/O) interfaces 26, a network interface 28, and a database 30. It should be appreciated that FIG. 2 depicts the NE 20 in a simplified manner, where some embodiments may include additional components and suitably configured processing logic to support known or conventional operating features. The components (i.e., 22, 24, 26, 28, 30) may be communicatively coupled via a local interface 32. The local interface 32 may include, for example, one or more buses or other wired or wireless connections. The local interface 32 may also include controllers, buffers, caches, drivers, repeaters, receivers, among other elements, to enable communication. Further, the local interface 32 may include address, control, and/or data connections to enable appropriate communications among the components 22, 24, 26, 28, 30.

It should be appreciated that the processing device 22, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 22 may also include or utilize stored program instructions (e.g., stored in hardware, software, and/or firmware) for control of the NE 20 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 24 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 24 may incorporate electronic, magnetic, optical, and/or other types of storage media. The memory device 24 may have a distributed architecture, where various components are situated remotely from one another, but can be accessed by the processing device 22.

The memory device 24 may include a data store, database (e.g., database 30), or the like, for storing data. In one example, the data store may be located internal to the NE 20 and may include, for example, an internal hard drive connected to the local interface 32 in the NE 20. Additionally, in another embodiment, the data store may be located external to the NE 20 and may include, for example, an external hard drive connected to the Input/Output (I/O) interfaces 26 (e.g., SCSI or USB connection). In a further embodiment, the data store may be connected to the NE 20 through a network and may include, for example, a network attached file server.

Software stored in the memory device 24 may include one or more programs, each of which may include an ordered listing of executable instructions for implementing logical functions. The software in the memory device 24 may also include a suitable Operating System (O/S) and one or more computer programs. The 0/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 22), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 22 or other suitable circuitry or logic). For example, when executed, the instructions may cause or enable the processing device 22 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 22), or any suitable combination thereof. Software/firmware modules may reside in the memory device 24, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 26 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 26 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 28 may be used to enable the NE 20 to communicate over a network, such as the network 10, the Internet, a Wide Area Network (WAN), a Local Area Network (LAN), and the like. The network interface 28 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 28 may include address, control, and/or data connections to enable appropriate communications on the network 10.

Furthermore, the NE 20 may include a path list generator 34, which may be configured to create a label stack or list of nodes in a path that starts at the NE 20 and ends back at the NE 20 itself. The path list generator 34 may be implemented in any suitable combination of hardware, software, firmware, etc. For example, when implemented (partially or fully) in software or firmware, the path list generator 34 may be stored as a computer program (e.g., logic, instructions, etc.) on the memory device 24, as illustrated. The path list generator 34 may be stored on any suitable non-transitory computer-readable media, such as the memory device 24, and may include instructed that enable the processing device 22 to perform specific functions. Also, when implemented (partially or fully) in hardware, the path list generator 34 may be configured in the processing device 22 (e.g., as an ASIC, hard-coded processor device, etc.).

According to various implementations of the present disclosure, the NE 20 may be configured to operate as any node in a network (e.g., network 10) having a plurality of nodes. The NE 20 may include at least the processing device 22 and the memory device 24, whereby the memory device 24 may be configured to store a computer program having instructions that, when executed, enable the processing device 22 to obtain information about the topology of the network 10 related to at least the nodes in direct communication with a peer node. For example, referring back to FIG. 1, if Node H is implemented as the NE 20 of FIG. 2, the peer node in this case may be Node G (as described above) and the relevant topology with respect to Node may include Nodes F, C, D, J, and I and corresponding links 12-2, 12, 3, 12-4, 12-5, 12-6. It may be noted that the NE 20 may, of course, consider itself (e.g., Node H) and the corresponding link (e.g., link 12-1) in the obtaining of topology information. After obtaining topology information, instruction (from the path list generator 34) are configured to enable the processing device 22 of the NE 20 (e.g., Node H) to generate one or more loopback packets. Each loopback packet may include at least a header having a path list (e.g., label stack) including one or more nodes of the plurality of nodes in the network 10. Each path list may be configured to define an order of nodes and/or links through which the respective loopback packet is to be transmitted. In some embodiments, for example, the network 10 may allow the implementation of Segment Routing (SR), whereby the path list may be a Segment Identifier (SID) list.

Link Protection

Figure 3A:
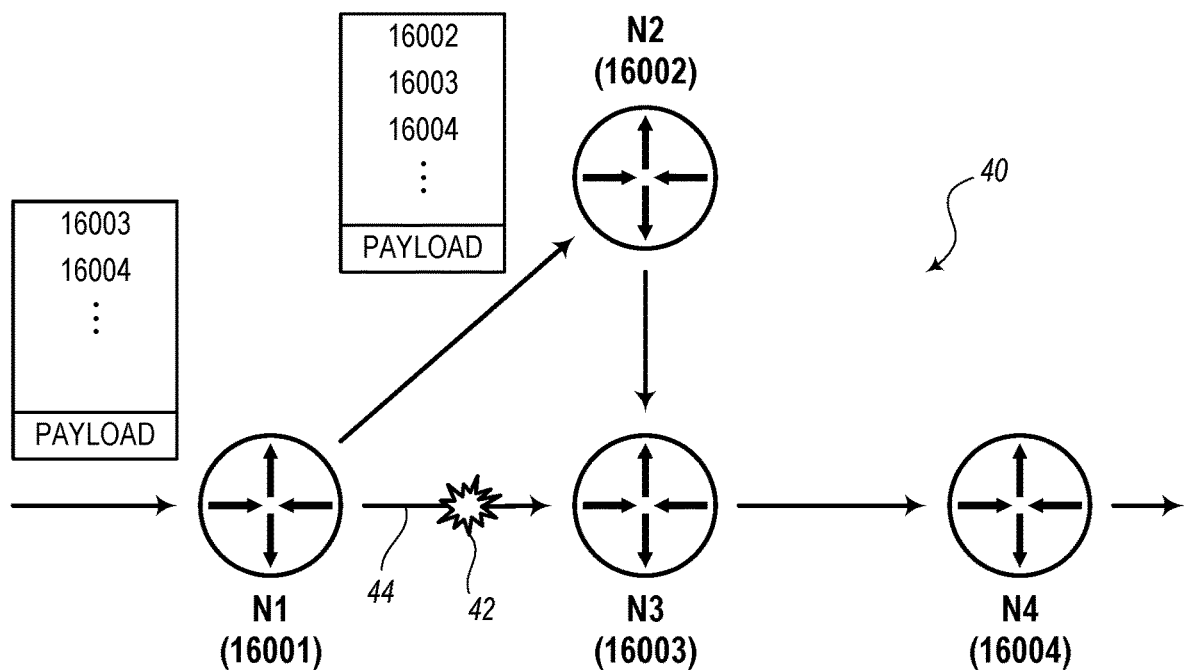
FIG. 3A is a diagram illustrating a link protection strategy for use when a failure is detected in a network, according to various embodiments.

FIG. 3A is a diagram illustrating an example of a "link protection" strategy for use when a failure is detected in a network 40. As illustrated in this embodiment, the network 40 includes Nodes N1, N2, N3, and N4 having addresses 16001, 16002, 16003, and 16004, respectively. If a fault 42 is detected on a link 44 between N1 and N3 and it is determined that N3 itself is not faulty, then a protection path may be used that bypassing the faulty link 44 but does not bypass the operable node N3. Thus, FIG. 3A shows a strategy for using local protection due to a link failure.

The network 40 may be a Segment Routing—Multi-Protocol Label Switching (SR-MPLS) system. In other embodiments, the network 40 may be equally applicable to Segment Routing (SR) (e.g., SRv6). With SR, Topology Independent Loop-Free Alternative (TI-LFA) is typically employed for local protection. A Point of Local Repair (PLR) device (e.g., N1) can compute local backup paths for node, link, and/or Shared Risk Link Group (SRLG) protection with appropriate Segment Identifier (SID) stacks. It may be noted that for SR-MPLS, SID may be an MPLS label. In the network 40, an incoming SID stack for primary path is <16003, 16004>. The PLR device (e.g., N1) detects that the link 44 is down (e.g., using BFD on the link). However, originally, it is not known if this event has been generated due to the remote peer node N3 failure as well. If the PLR device can determine unambiguously if the failure is due to the link 44 and not the node N3, it can use the SID stacks <16002, 16003, 16004> to bypass the link 44 (and essentially bypass the fault) and proceed with normal transmission (e.g., to N4). This can be done to minimize traffic loss.

Node Protection

Figure 3B:
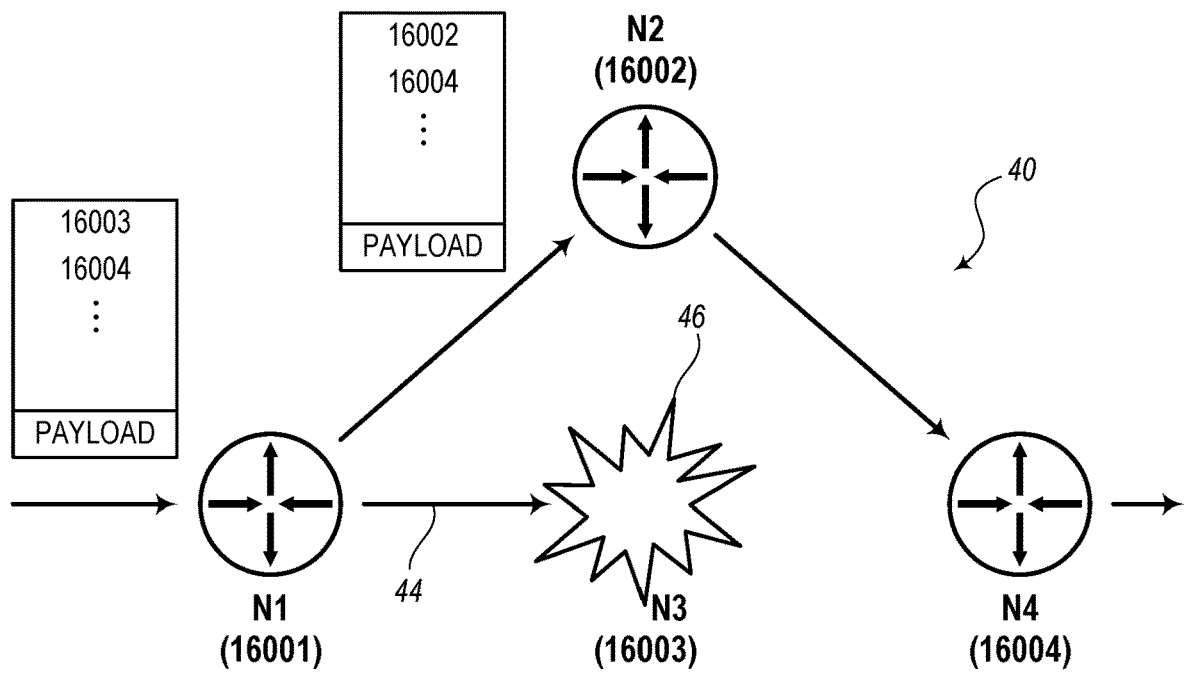
FIG. 3B is a diagram illustrating a node protection strategy for use when a failure is detected in a network, according to various embodiments.

FIG. 3B is a diagram illustrating an example of a "node protection" strategy for use when a failure is detected on a node in the network 40. When N1 is unable to communicate with N3 and it is determined that N3 is faulty (and not just the link 44), then the label stack can be arranged to bypass the entire node N3. If the PLR device (e.g., N1) can determine unambiguously if the failure is due to the node N3, it can use the SID stacks <16002, 16004> to bypass N3 (and essentially bypass the fault) and proceed with normal transmission (e.g., to N4). This can also be executed to re-route the impacted traffic to minimize traffic loss. If the fault event is due to node N3 failure, re-routed traffic may be dropped. According to the embodiments of the present disclosure and since the PLR device has the ability to detect node N3 failure, it can re-route the traffic to N4.

Examples of Loopback Paths

Figure 4A:
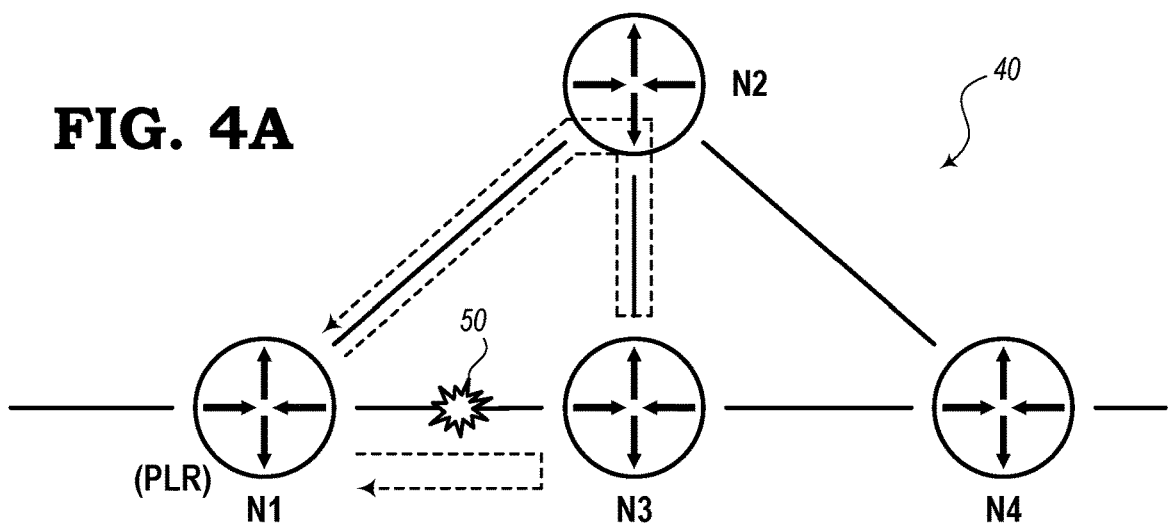
FIGS. 4A-4C are diagrams illustrating examples of different loopback paths for testing links associated with a peer node, according to various embodiments.
Figure 4B:
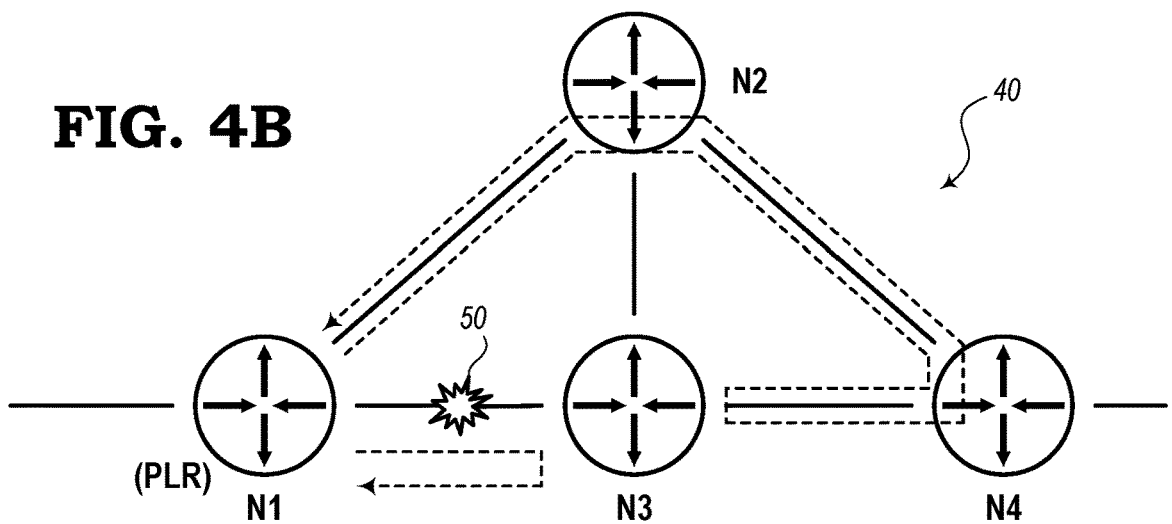
Figure 4C:
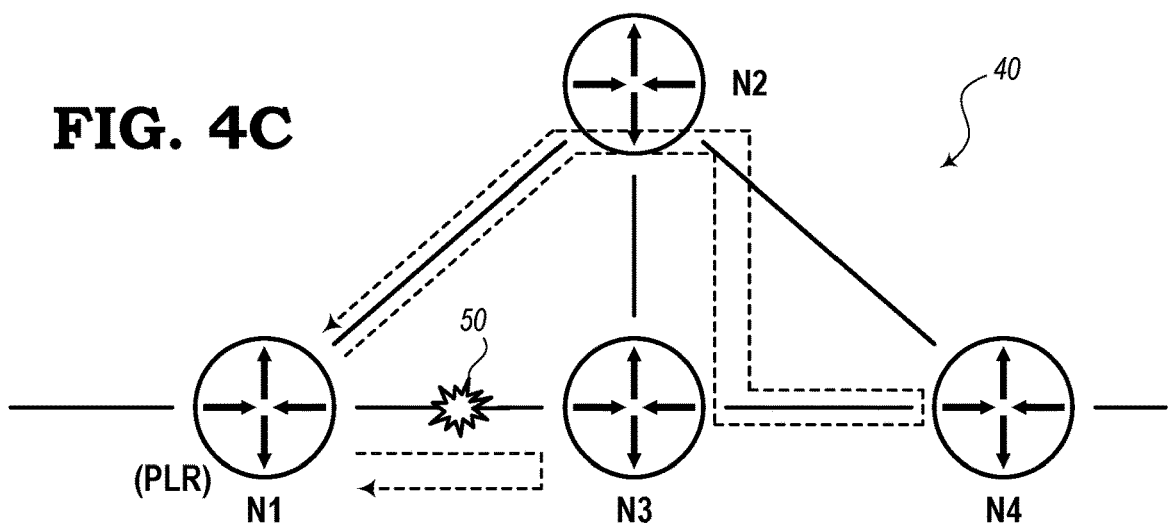

FIGS. 4A-4C are diagrams illustrating examples of different loopback paths for testing links associated with a peer node (e.g., node N3) in the network 40. The loopback packets transmitted through the network 40 can be used to distinguish between a link failure and a node failure. Utilizing SR, known network topology, prefix information, and adjacency SIDs, a PLR (N1) can compute a stack of SIDs. N1 can send a packet to a specific node and receive the same packet traversing a specific set of intermediate node(s) and link(s) in both forward and reverse directions. In this sense, the packet can be referred to as a "loopback" packet. A loopback packet may simply be switched in the data plane at the target node.

FIG. 4A shows a situation where a loopback packet includes a label stack in its header that defined a path N1-N2-N3-N2-N1. For example, this may follow a fault detection (e.g., using BFD) of an unknown fault 50 that prevents transmission between N1 and N3. Initially, it is unclear if this fault 50 is a link fault (e.g., fault 42 shown in FIG. 3A) or a node fault (e.g., fault 46 shown in FIG. 3B).

For instance, in FIG. 4A, the path list (e.g., SID stack, label stack, etc.) for loopback packets leaving N1 are sent to N2 with a SID stack <16003, 16002, 16001> (e.g., assuming penultimate hop popping) to follow the trajectory N1 to N2 to N3 to N2 to N1. In FIG. 4B, the path list (e.g., SID stack, label stack, etc.) for loopback packets leaving N1 are sent to N2 with a SID stack <16004, 16003, 16004, 16002, 16001> (e.g., again assuming penultimate hop popping) to follow the trajectory N1 to N2 to N4 to N3 to N4 to N2 to N1. Note that packets in FIGS. 4A and 4B are simply looped-back on N3 in the data plane and no new functionality is required on N3 in both the data and control planes. In FIG. 4C, the path list (e.g., SID stack, label stack, etc.) for loopback packets leaving N1 are sent to N2 with a SID stack <16003, 16004, 16003, 16002, 16001> (e.g., again assuming penultimate hop popping) to follow the trajectory N1 to N2 to N3 to N4 to N3 to N2 to N1. This loopback packet is looped back on N4 with no new functionality require on N4.

For each protected link, a PLR computes two sets of trajectories for loopback packets, where: 1) one trajectory is pinned down to the protected link in both forward and reverse direction, 2) one or more trajectories consisting of links that are not in the same Shared Risk Link Group (SRLG) as the protected link.

As illustrated, FIGS. 4A-4C show trajectories for loopback packets used to examine the liveness (operability) of link N1-N3 and node N3, where multiple options are shown in FIGS. 4A-4C for the examination of node N3 operability. It may be noted that a trajectory used to detect the operability of N3 can be executed via single neighbor or peer (e.g., N2) or multiple neighbors (e.g., N2 and N4) of the node N3 as shown. Suitable trajectories can be computed based on the Maximum SID Depth (MSD) capability of the corresponding PLR. Loopback packets may be transmitted and received periodically over the trajectories (e.g., in hardware) to achieve fast failure detection.

If the PLR device (e.g., N1) detects loss of a specified number of loopback packets within a specified time interval, it assumes that the liveness check fails for the associated link/node as follows (assuming a single failure):

a) If only link liveness check fails, link failure is assumed.

b) If only node liveness check fails, PLR does not assume any failure. The PLR will attempt to compute a new trajectory for node liveness check.

c) If both link and node liveness checks fail, node failure is assumed.

The PLR N1 may also re-route traffic differently depending on link or node failure. If PLR computes TI-LFA backup path as part of SRLG protection, it may use the SID stack of the backup path in the forward direction. The PLR may still derive the reverse SID stack from the forward SID stack to build the full SID stack for the loopback packets.

To improve the reliability of node failure detection, a PLR can compute a trajectory that traverses all links (except perhaps the protected link) attached to the target node N3 being tested. If such a trajectory is not feasible, a PLR can use multiple trajectories to detect node failure. For example, trajectories described with respect to FIGS. 4A and 4B may be used together to detect node failure.

N1 knows the topology of the network 40 including N1, N2, N3, and N4. This knowledge may be obtained by any suitable means, such as by using Interior Gateway Protocol (IGP) functionality. From this point, the node N1 can figure out how to make the path lists (e.g., SID lists) in the loopback (test) packets for surveying or scouting out the other links in the network. It may be noted that each of the nodes N1, N2, N3, N4 may be configured to run as a Point of Local Repair (PLR) device. That is, if a BFD packet is used to determine that there is a fault in the communication with a peer node, the source node can be utilized as a PLR device to act as a source for bypassing the faulty link (or node). Each PLR equipped with the functionality described in the present disclosure can therefore be configured to determine if the failure is a node failure or a link failure and can be configured to determine if multiple link failures with respect to the peer node are present.

General Process

Figure 5:
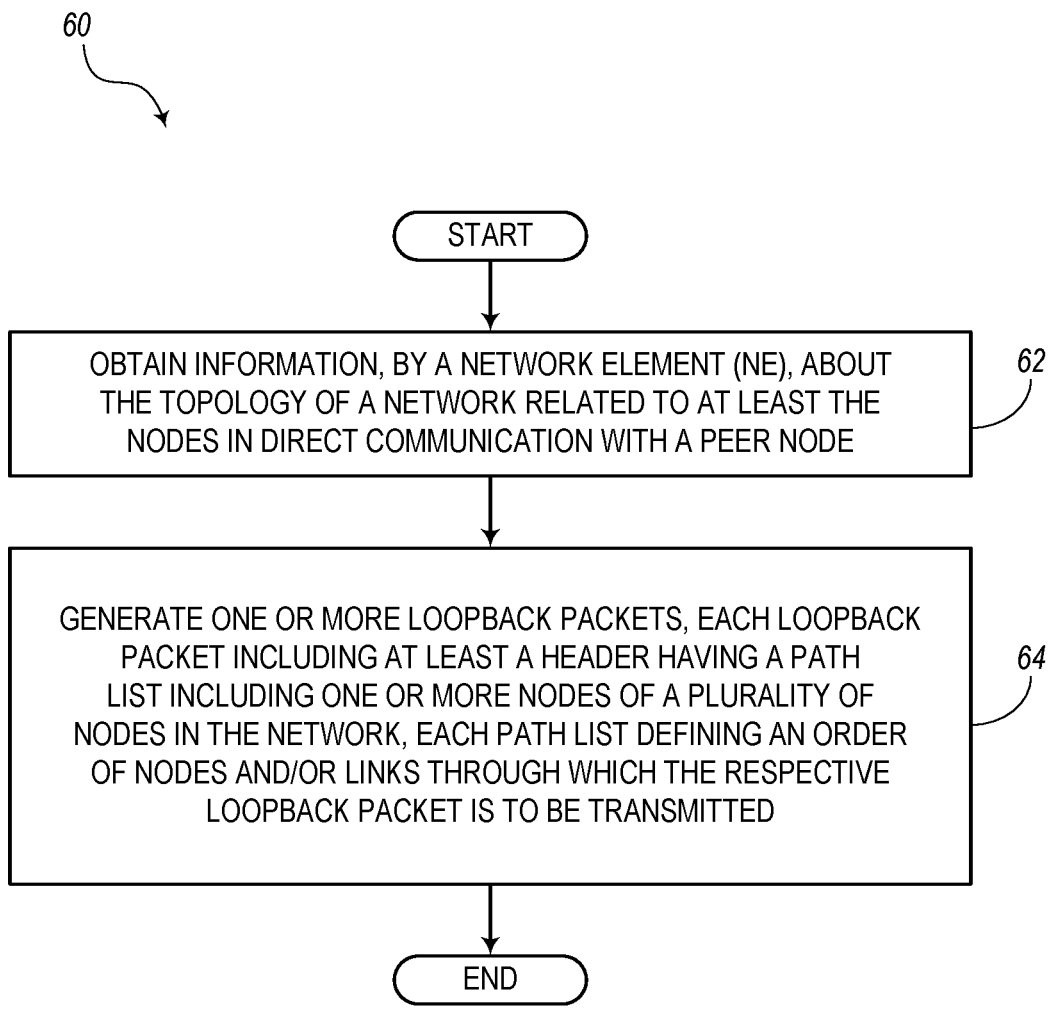
FIG. 5 is a flow diagram illustrating a process for creating loopback packets that include a path list defining an order of nodes through which the loopback packets are transmitted, according to various embodiments.

FIG. 5 is a flow diagram illustrating an embodiment of a process 60 for creating loopback packets that include a path list defining an order of nodes and/or links through which the loopback packets are transmitted. As illustrated in the embodiment of FIG. 5, the process 60 includes obtaining information about the topology of the network related to at least the nodes in direct communication with a peer node, as indicated in block 62. The process 60 also includes generating one or more loopback packets, as indicated in block 64, whereby each loopback packet includes at least a header having a path list including one or more of the plurality of nodes in the network. For example, each path list defines an order of nodes and/or links through which the loopback packets are transmitted.

According to additional embodiments, the network may allow the implementation of Segment Routing (SR), wherein the path list may be a Segment Identifier (SID) list. Also, the NE may be a Point of Local Repair (PLR) node, whereby the process 60 may further include generating the one or more loopback packets in response to detecting the existence of a failure in transmitting a packet to the peer node. In some embodiments, the process 60 may utilize Bidirectional Forwarding Detection (BFD) to detect the existence of the failure in transmitting the packet to the peer node. A "My Discriminator" field and a "Your Discriminator" field in BFD may be set to the same value that is associated with the NE. The process 60 may also include the steps of a) transmitting the one or more loopback packets through the network, b) determining which, if any, of the loopback packets are returned to the NE, and then c) based on which of the one or more loopback packets are returned, analyze whether the failure is a node failure of the peer node itself or a link failure of one or more links associated with the peer node. For example, if no loopback packets are returned to the NE, the processing device is configured to determine that the failure is a node failure.

Furthermore, the process 60 may be defined whereby each path list is configured to read the same forwards as it does backwards. Also, each loopback packet may include payload that identifies an attempted path associated with the path list of the respective loopback packet. For example, only the NE may be configured to process the payload of each of the one or more loopback packets. The process 60 can also include the step of generating a number of loopback packets related to the number of links in direct communication with the peer node. The step of obtaining information regarding at least the topology of the network in direct communication with the peer node may include the step of utilizing the Interior Gateway Protocol (IGP), where generating the one or more loopback packets may be based on the topology information.

Therefore, the systems and methods described in the present disclosure may provide mechanisms for local protection. The local behavior of the PLR may be executed regardless of the number of links and/or nodes the PLR needs to protect. A PLR device supporting the proposed mechanism may be configured to a) automatically identify the node(s) to which liveness check(s) is/are required, b) build the corresponding SRLG-diverse SID stacks (for both forward and reverse directions), to complete the loop from PLR (as source) back to the PLR (as destination), and c) start sending loopback packets periodically. When the PLR does not receive a certain number (e.g., about 3) of loopback packets within a certain time interval (e.g., about 10 ms), it may be configured to declare whether there is a link or node failure.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A Network Element (NE) operating as a node in a network having a plurality of nodes, the NE comprising:
   a processing device, and
   a memory device configured to store a computer program having instructions that, when executed, enable the processing device to
      obtain information about a topology of the network related to at least nodes in direct communication with a peer node, and
      generate one or more loopback packets, each loopback packet including at least a header having a path list including one or more nodes of the plurality of nodes in the network, each path list defining an order of nodes and/or links through which the respective loopback packet is to be transmitted.

2. The NE of claim 1, wherein the network allows the implementation of Segment Routing (SR), and wherein the path list is a Segment Identifier (SID) list.

3. The NE of claim 1, wherein the NE is a Point of Local Repair (PLR) node, and wherein the processing device is configured to generate the one or more loopback packets in response to detecting the existence of a failure in transmitting a packet to the peer node.

4. The NE of claim 3, wherein the processing device is configured to utilize Bidirectional Forwarding Detection (BFD) to detect the existence of the failure in transmitting the packet to the peer node.

5. The NE of claim 3, wherein the one or more loopback packets are generated such that a "My Discriminator" field and a "Your Discriminator" field in BFD are set to the same value associated with the NE.

6. The NE of claim 3, wherein the instructions further enable the processing device to
   transmit the one or more loopback packets through the network,
   determine which, if any, loopback packets are returned to the NE, and
   based on which of the one or more loopback packets are returned, analyze whether the failure is a node failure of the peer node itself or a link failure of one or more links associated with the peer node.

7. The NE of claim 6, wherein, if no loopback packets are returned to the NE, the processing device is configured to determine that the failure is a node failure.

8. The NE of claim 1, wherein each path list is configured to read the same forwards as it does backwards.

9. The NE of claim 1, wherein each loopback packet includes payload that identifies an attempted path associated with the path list of the respective loopback packet.

10. The NE of claim 9, wherein only the NE processes the payload of each of the one or more loopback packets.

11. The NE of claim 1, wherein the instructions further enable the processing device to generate a number of loopback packets related to the number of links in direct communication with the peer node.

12. The NE of claim 1, wherein obtaining information about the topology of the network related to at least the nodes in direct communication with the peer node includes utilizing the Interior Gateway Protocol (IGP), and wherein generating the one or more loopback packets is based on the topology information.

13. A non-transitory computer-readable medium of a Network Element (NE), the non-transitory computer-readable medium configured to store computer logic having instructions that, when executed, cause one or more processing devices to:
    obtain information about a topology of a network related to at least nodes in direct communication with a peer node, and
    generate one or more loopback packets, each loopback packet including at least a header having a path list including one or more nodes of a plurality of nodes in the network, each path list defining an order of nodes and/or links through which the respective loopback packet is to be transmitted.

14. The non-transitory computer-readable medium of claim 13, wherein the network allows the implementation of Segment Routing (SR), and wherein the path list is a Segment Identifier (SID) list.

15. The non-transitory computer-readable medium of claim 13, wherein the NE is a Point of Local Repair (PLR) node, and wherein the instructions cause the one or more processing devices to generate the one or more loopback packets in response to detecting the existence of a failure in transmitting a packet to the peer node.

16. The non-transitory computer-readable medium of claim 15, wherein the instructions cause the one or more processing devices to utilize Bidirectional Forwarding Detection (BFD) to detect the existence of the failure in transmitting the packet to the peer node, and wherein the one or more loopback packets are generated such that a "My Discriminator" field and a "Your Discriminator" field in BFD are set to the same value associated with the NE.

17. The non-transitory computer-readable medium of claim 15, wherein the instructions further cause the one or more processing devices to
    transmit the one or more loopback packets through the network,
    determine which, if any, loopback packets are returned to the NE,
    based on which of the one or more loopback packets are returned, analyze whether the failure is a node failure of the peer node itself or a link failure of one or more links associated with the peer node, and
    determine, if no loopback packets are returned to the NE, that the failure is a node failure.

18. A method comprising the steps of:
    obtaining information about a topology of a network related to at least nodes in direct communication with a peer node, and
    generating one or more loopback packets, each loopback packet including at least a header having a path list including one or more nodes of a plurality of nodes in the network, each path list defining an order of nodes and/or links through which the respective loopback packet is to be transmitted.

19. The method of claim 18, wherein each loopback packet includes payload that identifies an attempted path associated with the path list of the respective loopback packet, and wherein only the NE is configured to process the payload of each of the one or more loopback packets.

20. The method of claim 18, further comprising the step of generating a number of loopback packets related to the number of links in direct communication with the peer node.

* * * * *